United States Patent
Karta et al.

(10) Patent No.: US 9,503,463 B2
(45) Date of Patent: Nov. 22, 2016

(54) DETECTION OF THREATS TO NETWORKS, BASED ON GEOGRAPHIC LOCATION

(71) Applicant: Zimperium, Inc., Tel Aviv (IL)

(72) Inventors: Yaniv Karta, Ramat Gan (IL); Itzhak Avraham, Kfar Yona (IL)

(73) Assignee: Zimperium, Inc., San Francisco, CA (US)

( * ) Notice: Subject to any disclaimer, the term of this patent is extended or adjusted under 35 U.S.C. 154(b) by 21 days.

(21) Appl. No.: 13/892,337

(22) Filed: May 13, 2013

(65) Prior Publication Data
US 2013/0305369 A1    Nov. 14, 2013

Related U.S. Application Data

(60) Provisional application No. 61/646,378, filed on May 14, 2012.

(51) Int. Cl.
H04L 29/06    (2006.01)

(52) U.S. Cl.
CPC ..... *H04L 63/1416* (2013.01); *H04L 2463/146* (2013.01)

(58) Field of Classification Search
CPC .................. H04L 2463/146; H04L 63/1416
USPC .......................................................... 726/23
See application file for complete search history.

(56) References Cited

U.S. PATENT DOCUMENTS

| | | | | |
|---|---|---|---|---|
| 7,293,289 B1 * | 11/2007 | Loc et al. | | 726/23 |
| 7,823,199 B1 * | 10/2010 | Rathi | | H04L 63/1408 370/338 |
| 8,151,341 B1 * | 4/2012 | Gudov | | H04L 63/1408 726/13 |
| 8,489,732 B1 * | 7/2013 | Liang | | H04L 63/108 370/395.2 |
| 8,495,060 B1 * | 7/2013 | Chang | | 707/723 |
| 8,549,641 B2 * | 10/2013 | Jakobsson | | 726/23 |
| 9,386,030 B2 * | 7/2016 | Vashist | | H04L 63/1416 |
| 2004/0236604 A1 * | 11/2004 | McNair | | 705/2 |
| 2006/0123479 A1 * | 6/2006 | Kumar et al. | | 726/23 |
| 2006/0193299 A1 * | 8/2006 | Winget et al. | | 370/338 |
| 2006/0225133 A1 * | 10/2006 | Balasubramaniyan et al. | | 726/22 |
| 2006/0253907 A1 * | 11/2006 | McConnell | | 726/23 |

(Continued)

OTHER PUBLICATIONS

Archibald, N., "Exploring Heap-Based Buffer Overflows with the Application Verifier," Cisco Blog, Mar. 29, 2010, 13 pages, [online] [retrieved on May 6, 2014] Retrieved from the internet <URL:http://blogs.cisco.com/security/exploring_heap-based_buffer_overflows_with_the_application_verifier/>.

(Continued)

*Primary Examiner* — Joseph P Hirl
*Assistant Examiner* — J. Brant Murphy
(74) *Attorney, Agent, or Firm* — Fenwick & West LLP

(57) ABSTRACT

A method for a wireless network. The network includes at least a server and a plurality of computer devices wirelessly connected to the server. At least one of the computer devices is under attack by an 'attacker' device. The method provides for detection and reporting of the attack as to the location of the attack. The method includes detecting an attack by one of the computer devices, using a zCore module and transmitting an 'attack report' to the server. The report includes at least the attack location. The method also includes notifying at least one of the plurality of computer devices and an external computer device that the network is compromised.

20 Claims, 6 Drawing Sheets

(56) References Cited

U.S. PATENT DOCUMENTS

| | | | | |
|---|---|---|---|---|
| 2007/0117593 | A1* | 5/2007 | Izdepski | H04L 63/14 455/565 |
| 2007/0186284 | A1* | 8/2007 | McConnell | 726/25 |
| 2008/0052395 | A1* | 2/2008 | Wright et al. | 709/224 |
| 2008/0183389 | A1* | 7/2008 | Chainer | G01V 3/00 702/2 |
| 2009/0125981 | A1* | 5/2009 | Krischer et al. | 726/3 |
| 2009/0247189 | A1* | 10/2009 | Sennett | H04L 67/18 455/456.2 |
| 2010/0030892 | A1* | 2/2010 | Jeong et al. | 709/224 |
| 2010/0077483 | A1* | 3/2010 | Stolfo et al. | 726/24 |
| 2011/0197274 | A1* | 8/2011 | Callon | H04L 47/10 726/22 |
| 2013/0174257 | A1* | 7/2013 | Zhou et al. | 726/23 |
| 2013/0247132 | A1* | 9/2013 | Dey | 726/1 |
| 2013/0263256 | A1* | 10/2013 | Dickinson et al. | 726/22 |
| 2013/0269032 | A1* | 10/2013 | Chasko et al. | 726/23 |

OTHER PUBLICATIONS

Avraham, T., "Non-Executable Stack ARM Exploitation Research Paper," Revision 1.0, 2010-2011, 19 Pages, [online] [retrieved on May 6, 2014] Retrieved from the internet <URL:http://media.blackhat.com/bh-dc-11/Avraham/BlackHat_DC_2011_Avraham_ARM%20Exploitation-wp.2.0.pdf>.

Bell, D., "UML basics: The sequence diagram," IBM Corporation, Feb. 16, 2004, 15 pages, [online] [retrieved on May 6, 2014] Retrieved from the internet <URL:http://www.ibm.com/developerworks/rational/library/3101.html>.

Daniel, M., et al., "Engineering Heap Overflow Exploits with JavaScript," Usenix, 2008, 6 pages, [online] [retrieved on May 6, 2014] Retrieved from the internet <URL:https://www.usenix.org/legacy/event/woot08/tech/full_papers/daniel/daniel.pdf>.

"Linux Kernel kvm_dev_ioctl_get_supported_cpuid() code execution" linux-kernel-supportedcpuid-code-execution (53934), IBM Internet Security Systems, Oct. 23, 2009, 5 pages, [online] [retrieved on May 6, 2014] Retrieved from the internet <URL:http://xforce.iss.net/xforce/xfdb/53934>.

Renders, J-M., et al., "Hybrid Methods Using Genetic Algorithms for Global Optimization," IEEE Transactions on Systems, Man, and Cybernetics—Part B: Cybernetics, Apr. 1996, pp. 243-258, vol. 26, No. 2, can be retrieved at <URL:http://sci2s.ugr.es/eamhco/pdfs/renders96hmgs.pdf>.

Wang, X., et al., "Improving Integer Security for Systems with Kint," Proceeding OSDI'12 Proceedings of the 10th USENIX conference on Operating Systems Design and Implementation, 2012, 15 pages, can be retrieved at <URL:http://pdos.csail.mit.edu/papers/kint:osdi12.pdf>.

U.S. Appl. No. 13/865,212, filed Apr. 18, 2013, 33 Pages.

* cited by examiner

DETECTION OF THREATS TO NETWORKS, BASED ON GEOGRAPHIC LOCATION

FIELD OF THE INVENTION

The present invention relates generally to the field of security, and in particular, to mobile devices and applications security.

BACKGROUND OF THE INVENTION

Intrusion detection and prevention systems constantly monitor communications that flow in the networking environment. They protect and intercept or drop suspicious network traffic, as well as issue an alert to the network administrator. The process of intercepting or dropping suspicious traffic ensures the security of the network.

Networks are vulnerable to malicious attacks or threats, which may take the form of Trojans or Malware that, may sniff and collect user information for unknown future attacks.

Mobile Devices such as phones, smartphones, tablets or any mobile computing platforms can use methods such as Global Positioning System (GPS), Wireless Network Basic Service Set Identity (BSSID)/SSID or Global System for Mobile (GSM) Triangulations or Geo Internet Protocol (IP) Database among other methods to collect data concerning the physical location of a mobile device. A service set identifier (SSID) may be defined as a sequence of characters that uniquely names a wireless local area network (WLAN). An SSID is sometimes referred to as a "network name." This name allows stations to connect to the desired network when multiple independent networks operate in the same physical area. Each set of wireless devices communicating directly with each other is called a basic service set (BSS).

Statistical anomaly-based detection is one category of intrusion detection: This method of detection baselines performance of average network traffic conditions. After a baseline is created, the system intermittently samples network traffic, using statistical analysis to compare the sample to the set baseline. If the activity is outside the baseline parameters, the intrusion prevention system takes the appropriate action. The particular intrusion in this case monitors users and network behaviors. Clustering is one form of such statistical techniques.

Today there is no solution that can identify a 'clean zone' or 'trust zone', i.e. a specific geographical location or region, which has not gone through multiple attacks or predefined threshold number of attacks by one or more networks. The types of attack may vary from one location to another and may include for example: drive-by attacks, Drive-by spamming attack, basement attack, man-in-the-middle attack and other types of attacks as known in the art.

Much less application of clustering techniques to a trust zone for drive-by attacks. There is no solution that can show an attack in a specific location because of two main reasons:

1. These types of attacks are not being detected; and
2. The attacks are not reported, especially to enable drawing a threat or an attack related level map i.e. in the prior art there is no correlation between the attack itself and the location of the attack.

For example attacks on an organization or company are generally at the location of the organization itself, such as the company's headquarters. Commonly, the organization includes many branches in various locations e.g. the attacks can be in Branch A located in zone 1, in Branch B located in zone 2 and in Branch C located in zone 3. Furthermore, people are more mobile today, especially with the proliferation of numbers and types of mobile devices, many with expanded computing power, and while traveling they may be unaware of attacks relative to their current geographic location. Moreover, it is common that primary executives, such as the company's CEO or CFO, are being targeted wherever they are. For example at a coffee shop, outside of the company's network location. Additionally, attacks are being targeted to more diverse and more specific locations, for example when an executive is on vacation or the attacker may be attempting industrial spying. Therefore the significance of knowing and identifying 'danger' or 'malicious' zones is advantageous in order to prevent further attacks at one or more specific locations.

SUMMARY OF THE INVENTION

It is therefore an object of the present invention to provide a novel intrusion prevention system and method, which can be deployed on mobile computing devices and platforms such as mobile devices, able to detect and report attacks, especially to enable drawing a threat level map, and to correlate the attack and the attack type with the location of the attack.

It is therefore provided in accordance with a first embodiment of the invention a method for detecting and reporting an attack with the location of the attack in a wireless network, the network comprising at least a server and a plurality of computer devices wirelessly connected to said server, wherein at least one of the plurality of computer devices is under attack by an 'attacker' device, the method comprising: detecting at least one attack by a detection/prevention module; correlating each of the at least one attack with the location of the at least one attack; transmitting an 'attack report' to said server, said report comprising at least the attack location; and notifying at least one of said plurality of computer devices and an external computer device that the network is compromised.

According to another embodiment of the invention, there is provided a computerized system for detecting and reporting an attack and the location of the attack in a wireless network, the network comprising at least a server and a plurality of computer devices wirelessly connected to the server, wherein at least one of the plurality of computer devices is under attack by an 'attacker' device, the system comprising:

a detection/prevention module configured to send threat/attack information to the server and process commands received from the server;

a processing module configured to receive the threat/attack information from the detection/prevention module and identify if the network is a compromised network and the location of the compromised network; and a management console configured to monitor and display the location of the compromised network.

The disclosed invention further provides an intrusion prevention system and method, which can be deployed on mobile computing platforms.

In one preferred embodiment of the present invention an intrusion prevention system is disclosed whose network events are processed and indicate a classification of dangerous zones according to the mass of 'Threats Per Location' (TPL).

In another preferred embodiment of the present invention, determination of the threat level is made using previously shared information regarding network threat level or network safety status, or details of a scanned network using toolkits known in the art such as Android Network Toolkit (ANTI), Metasploit™ or any other penetration testing toolkit known in the art.

In yet another preferred embodiment of the present invention, a Geolocation based events are sent to a database. The database entries are classified and a regional map is calculated, depicting compromised networks according to location parameters such as GPS coordinates.

In yet another preferred embodiment of the present invention, the intrusion prevention system takes active steps to block suspicious traffic.

In yet another preferred embodiment of the present invention, the intrusion prevention system takes active action such as disconnecting the current connection or reporting a compromised network for preemptive measures, when it detects suspicious traffic.

In yet another preferred embodiment of the present invention, the intrusion prevention system acquires pre-knowledge based on earlier attacks at specific geographic locations, prior to the enumeration of current networks in the geographical region.

In yet another preferred embodiment of the present invention, the system can establish safe passage using virtual private network (VPN) encrypted data over unsecured channels on malicious or compromised networks. The virtual private network (VPN) extends a private network across public networks like the Internet. It enables a host computer to send and receive data across shared or public networks as if they were an integral part of the private network with all the functionality, security and management policies of the private network. This is done by establishing, for example a virtual point-to-point connection through the use of dedicated connections, encryption, or a combination of the two.

In yet another preferred embodiment of the present invention, the system can establish a secure connection to a management cloud servers for analysis of threats and malicious actions taking place near a predetermined location.

In yet another preferred embodiment of the present invention, the protection provided by the present invention is introduced at the endpoint device of the exemplary corporate executive.

In yet another embodiment of the present invention the intrusion prevention system takes active steps to block suspicious networks even before the system is connected to them, as the system knows the network is suspicious before connecting to it, i.e. prior to establishing any connection to a network it is known that the geographical location related to the network is compromised.

In yet another preferred embodiment of the present invention the intrusion prevention system is based on defined policies. For example if one is in a danger zone and under a low or medium level attack, it can be defined as a higher level because the zone is already declared a danger zone.

A method is disclosed for a wireless network. The network includes at least a server and a plurality of computer devices wirelessly connected to the server. At least one of the computer devices is under attack by an 'attacker' device. The method provides for detection and reporting of the attack as to the location of the attack. The method includes detecting an attack by one of the computer devices, using a zCore module and transmitting an 'attack report' to the server. The report includes at least the attack location. The method also includes notifying at least one of the plurality of computer devices that the network is compromised.

The attacks can be in the form of scans or man-in-the-middle attacks or other types of attacks as listed and defined below.

According to some embodiments of the invention, the process of identifying and localizing an attack begins from the point of attack to the endpoint device of an enterprise user. The device reports its location and sends events to the server. The server replies with commands. The canonical command structure applies to a list of poisoned networks automatically and/or networks that are nearby and might have been attacked. The system and method of the invention are configured to provide a correlation between the attack and the location of the attack.

For example, if there was a first network that was attacked nearby the location of the user and the user has just connected to a second network nearby the first network that was attacked then the user device will automatically get a list of networks that were attacked. The user device will send an event that says "I am in location X, everything is okay." The network will respond that within a specific radius of the user device location there were a number of networks, such as the first network, that were attacked with a specified severity. If the severity level is high a policy may be applied in "panic mode," such as "disconnect from the network." The thresholds of attack severity definitions are configurable variables.

According to one embodiment of the invention, networks are considered suspicious if they have been attacked, not simply if they are in the area during a specific time period relative to the time of attack(s). Thus thresholds of radial distance and time are applied.

According to another embodiment of the invention, the system calculates a sphere, not just a two dimensional mapping. The distance parameter is a spherical radius because attacks may be on the upper floors of a building or in subbasement parking lots. There are several ways to solve for the "nearest neighbor network," according to an applied algorithm.

The present invention is the first solution to correlate the particular attack with the location of the attack, especially if the attacker is on the move. Prior art detection systems are typically on site at the location of the company's consolidated premises in a single building. Certain types of high level attacks, such as the types of attack listed below and above are hard to detect.

In the present invention, the following terms are defined for sake of clarity:

Honey pot systems are decoy servers set up to gather information regarding an attacker or intruder into an enterprise system. A Honey pot system is set up to be easier prey for intruders so their activity can be logged or traced.

The term 'hotspot' refers to a site that offers Internet access over a wireless local area network (WLAN) through the use of a router connected to a link to an Internet service provider. Hotspots typically use WiFi technology. Hotspots are often found at restaurants, train stations, airports, libraries, hotels, hospitals, coffee shops, bookstores, fuel stations, department stores, supermarkets, RV parks and campgrounds, public pay phones, and other public places. Many universities and schools have wireless networks in their campus.

If one opens a WiFi, for example on a mobile phone or android, or a router having a wireless connection to the Internet which may be publicly available for access. For hot spots this type of attack is very difficult to detect because they might appear in legitimate networks doing legitimate work because the man controlling the router can use the traffic to alter it, and thereby compromise the device without the user knowing about it. Hot spots in this context are related to drive-by attacks. Attackers usually concentrate on a specific target and develop a profile of the target. As the attackers know what its destination is, its schedule, and which networks it usually connects to, they can build a detailed profile of the target which is later used to plan an attack on the target.

The term 'drive-by attacks', refers to, a scenario where a user such as an executive drives-by a danger zone and the present invention devise and system may display, for example using a console, danger zones if the executive will enter a suspicious zone. Once the danger zone has been identified due to previous attacks and the executive approaches this zone or automatic connection to the network, alerts will be sent.

A drive-by attack is illustrated by the following scenario. If it is perceived that a user such as a mobile device executive, is about to enter a hot spot, and is about to be connected to a network the executive is given a warning. If the executive is about to connect to a network that has a specific name, for example INSYS, and executive's mobile device is about to automatically connect to the INSYS, one's home network, and the router name has not been changed, whether there are passwords or not. A third party such as a hacker connected to the same executive's hot spot connects to the INSYS. As the hacker knows that the executive's mobile device will try to connect to it and he can steal the executive's data.

Drive-by spamming attack is a variation of drive-by hacking, for example, in which perpetrators gain access to a vulnerable wireless local area network (WLAN) and use that access to send huge volumes of spam.

The term 'basement attack' refers to a scenario such as when a 'target' is connected to his provider through for example a GSM network. If there are many antennas and one antenna has been determined to be a "steady antenna," the connection will likely be to that antenna. The BSSID is the mock address of the network and the SSIB is the Wi-Fi network name. These can be changed. An attacker can co-opt the mock address and falsely apply it to a network for malicious purposes. The false name is applied just to encourage a target device to connect to it.

The term 'dangerous zone' refers to a specific location, which has gone through multiple attacks by multiple networks.

The term 'threats per location' (TPL), refers to a classification of dangerous zones according to the mass of the TPL.

The term 'scanning attack' refers to a procedure to discover the target's vulnerabilities.

The term 'man-in-the-middle attack' (MITM) intercepts a communication between two systems. For example, the target is the TCP connection between client and server. The attacker splits the original Transmission Control Protocol (TCP) connection into 2 new connections: one between the client and the attacker and the other between the attacker and the server. Once the TCP connection is intercepted, the attacker acts as a proxy, being able to read, insert and modify the data in the intercepted communication.

The term 'zCore' refers to the zcore.ko kernel object which is loaded on physical device, e.g. mobile device, or virtual device, e.g. software emulated device that can run on any environment.

The term 'zConsole' refers to management console which is used for visualization and management of devices such as mobile devices and corresponding threats and risk level. The zConsole allows configuration of the endpoint devices, and their security policies for prevention and mitigation of threats. The zConsole can be deployed on a cloud, or inside an organization DMZ (Demilitarized Zone), for example, using the mobile device.

The term Android Network Toolkit (ANTI) refers to information related to the network safety status. The present invention accesses this information through the cloud in order to anticipate problems upon entering particular networks. The data is also weighted by the present invention.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of a non-limiting example only, with reference to the accompanying drawings, in the drawings.

All the above and other characteristics and advantages of the invention will be further understood through the following illustrative and non-limitative description of preferred embodiments thereof.

DETAILED DESCRIPTION OF PREFERRED EMBODIMENTS

The principles and operation of a method and an apparatus according to the present invention may be better understood with reference to the drawings and the accompanying description, it being understood that these drawings are given for illustrative purposes only and are not meant to be limiting.

In order to simplify the present description some of the details provided in U.S. application Ser. No. 13,865,212 entitled "PREVENTIVE INTRUSION DEVICE AND METHOD FOR MOBILE DEVICES" are not repeated, and U.S. application Ser. No. 13,865,212 is incorporated herein by reference.

The present invention is configured to detect and report network events such as attacks, and to draw a threat level map, which correlate the attacks and the attacks type with the location of the attack. The attacks drawn at the map are further processed and indicate a classification of dangerous zones according to the mass of 'Threats Per Location' (TPL).

Advantages of the invention over prior art: 1) The present invention identifies malicious attacks via mobile networks 2) The present invention tracks a change in the network's identifier, which indicates an attack is underway 3) The present invention may identify a mobile network and map it as a compromised network.

In an exemplary scenario, a research team of an enterprise organization is being targeted and it is known that they go to lunch every day at 1:00 at a specific Café. An attacker can attempt an attack at that place and time. According to the present invention solution, if one of the team is attacked all the team members are alerted accordingly. They will be warned not to go to this restaurant because there has been an attack at that zone defined as a 'dangerous zone'. According to some embodiments of the invention, to avoid receiving alerts relating to all zones including the specific café network, it may be sufficient to warn against an attack for a specific network at a specific location or in the case of a severe threat it may be desirable to avoid any network at that location.

According to some embodiment of the invention, clustering thresholds are provided for each type of zone. For example in a city like Portland, Oreg., which may be considered generally quiet, three attacks may be considered a danger zone. In an airport the threshold may be more like ten attacks.

Figure 1A:
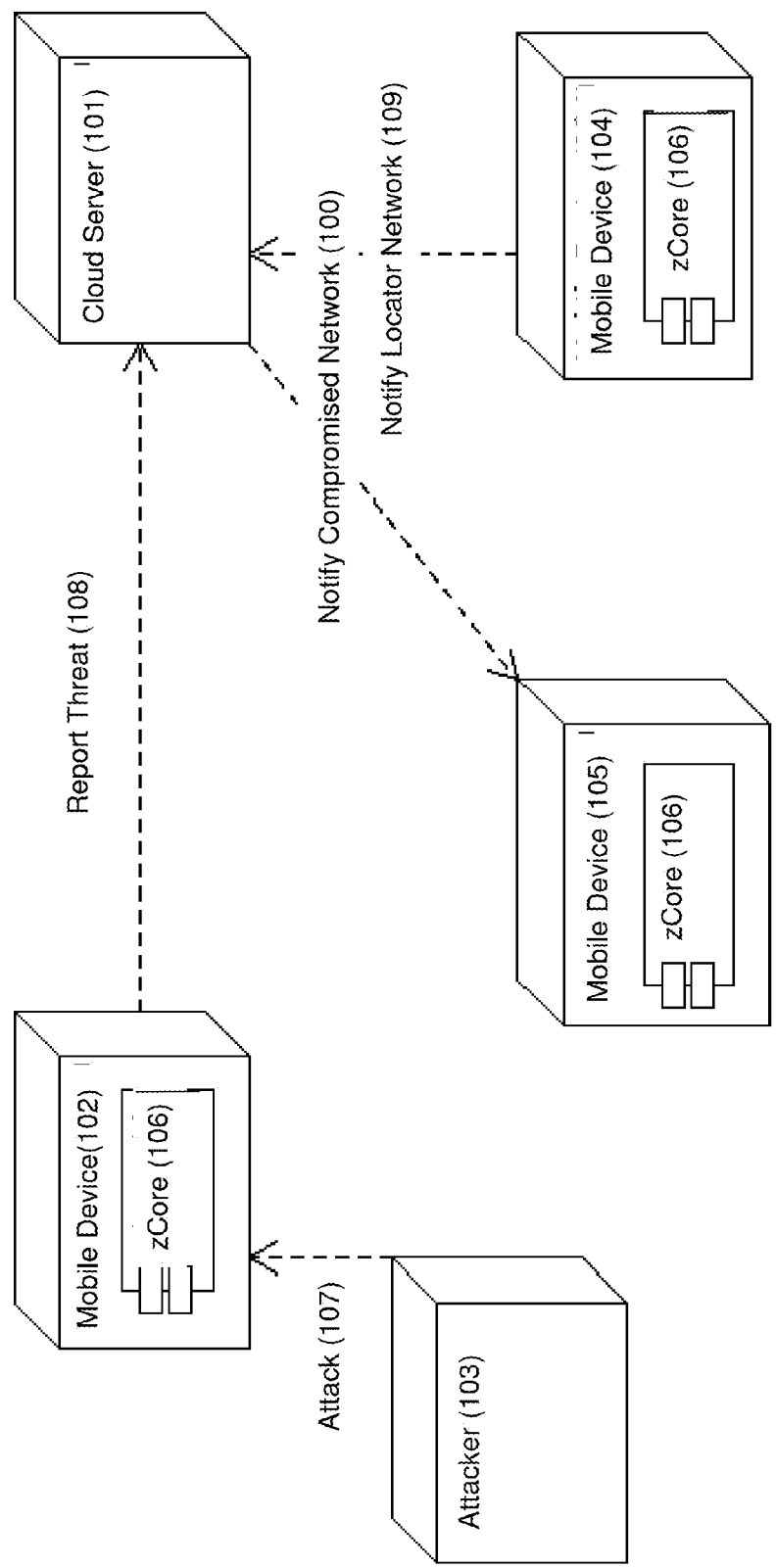
FIG. 1a illustrates the general flow of an attack and location-based preventive measures, constructed according to the principles of the present invention.

FIG. 1a illustrates a general flow of an attack and location-based preventive measures, constructed according to the principles of the present invention. Several devices in a modern networking environment containing various components are displayed. Cloud server module 101 represents a physical entity reachable, for example via Internet based protocols. Cloud servers may include, but are not limited to, a secure communication server database solution and application level processors and/or adapters. Cloud server module 101 may be in communication or wirelessly connected to mobile devices 102,104,105, such as tablet, smart phone, or any or any mobile computing platforms known in the art. The mobile devices 102, 104,105, include or may be in communication with zCore sub-module 106. According to one embodiment of the present invention, the zCore sub-module 106 is configured to detect and prevent penetration to the devices using a wide range of techniques and solutions. The zCore Kernel extension exposes a kernel level API to the firmware. This is used to pass functions and operations from the application level to the lower levels, i.e. to the kernel and hardware. The zCore API may be used by 3rd party applications.

As illustrated in FIG. 1a, the scenario begins when an attacker 103, such as a business competitor performing industrial spying using his mobile device tries to attack mobile device 102 using attack methods 107.

Attack methods 107 may contain, but are not limited to: MITM attack (described above), ARP spoofing, ARP spoofing, DNS poisoning, Port scanning and Malicious injection. ARP spoofing is a technique whereby an attacker sends fake ("spoofed") Address Resolution Protocol (ARP) messages onto a Local Area Network; DNS poisoning is a computer hacking attack, whereby data is introduced into a Domain Name System (DNS) name server's cache database, causing the name server to return an incorrect IP address, diverting traffic to the attacker's computer. Port scanning identifies open doors to a computer; Port scanning has legitimate uses in managing networks, but port scanning also can be malicious in nature if someone is looking for a weakened access point to break into one's mobile device. Malicious injection is the exploitation of a computer bug that is caused by processing invalid data. For example, code injection can be used by an attacker to inject code into a computer program to change the course of execution.

At the next step, mobile device 102, which contains the zCore 106 sub-module, prevents the attack 107 and reports to the cloud servers 101 with a threat response message 108, containing various fields and variables, including for example, the attack time, attack type, attack location, MAC address of attacker (such as attacker 103), MAC address of compromised network, BSSID, SSID, GPS coordinates, geo IP location, and other parameters describing penetration attempts. Cloud Servers 101 receive one or more threat reports 108 from mobile device 102, that the network might be compromised.

Among cloud server's 101 responsibilities is to preemptively notify compromised networks 100 and/or notify, while reaching a geographical region, where nearby compromised networks may be located 109, by perception metering. This is done, for example by calculating the nearest neighbors of geo-spatial locations intersected with malicious networks by SSID,BSSID, last known location coordinates and radius of networks most probable to be connected to the compromised networks.

At the next step, once attacker 103 attacks mobile device 102 other mobile devices 104, 105 located nearby are notified that this network is compromised. According to another scenario device 104 is not nearby, but as he approaches into a specific zone, such as a malicious zone or a dangerous zone, he may request or automatically receive a list, for example from the cloud server, of all networks that are active locally, and requests synchronization of information with all networks. He then gets a list of all networks that were close by, and therefore have become compromised. However, if the network is safe, the cloud server 101 will not add it to the list. Unless cloud server(s) 101 are used in the reporting process, the solution will not be scalable.

According to exemplary embodiments mobile devices can report to each other if they are on the same network, or they have each other's addresses, without being connected through the cloud server.

An IPS provides policies and rules for network traffic along with an intrusion detection system for alerting system or network administrators to suspicious traffic, but allows the administrator to provide the action upon being alerted. According to exemplary embodiments of the present invention policy thresholds determine whether listed unsafe networks should be blocked or merely warned. According to one embodiment of the invention, higher level attacks, such as honeypot, SQL slammer and cross-site scripting, which occur everywhere, are generally not location-based, and therefore are not mapped, while low and medium level attacks, such as spammers, which are generally location-based are mapped. According to some embodiments of the invention the location may occasionally be provided for higher level attacks.

In the case of too few attacks 107 to be significant, or a lapse of a considerable amount of time, it may be that the attacks 107 may not need to be reported, again based on policy thresholds. For example, if an attack 107 occurred at a specific cafe yesterday, it may not be relevant to report on the attack and map it the day after as the attack was terminated. For example, if a device is approaching a radius of one kilometer to a network and connection takes place at 50 meters the device will be in the range of being alerted.

Cloud server 101 performs radius based clustering accordingly. zConsole is specified in the context of cloud server 101.

According to one embodiment of the invention, a state machine on the client's side, for example a mobile device state machine, knows how to parse all the commands that come from the servers. For example, the following commands may be used: command: a malicious attack is detected-therefore the servers provide a list of the networks nearby to the current location; command: service set identifier (SSID); command: revoke: if one wants to revoke devices; the devices send events; if the device detected a threat or device sync, once one connects to a network, a sync is requested: "Hi, is there anything nearby?" [did not understand]

A preferred embodiment describes a protocol used to connect to the cloud regarding the attacks, however other protocols and configurations may be implemented as well.

Figure 1B:
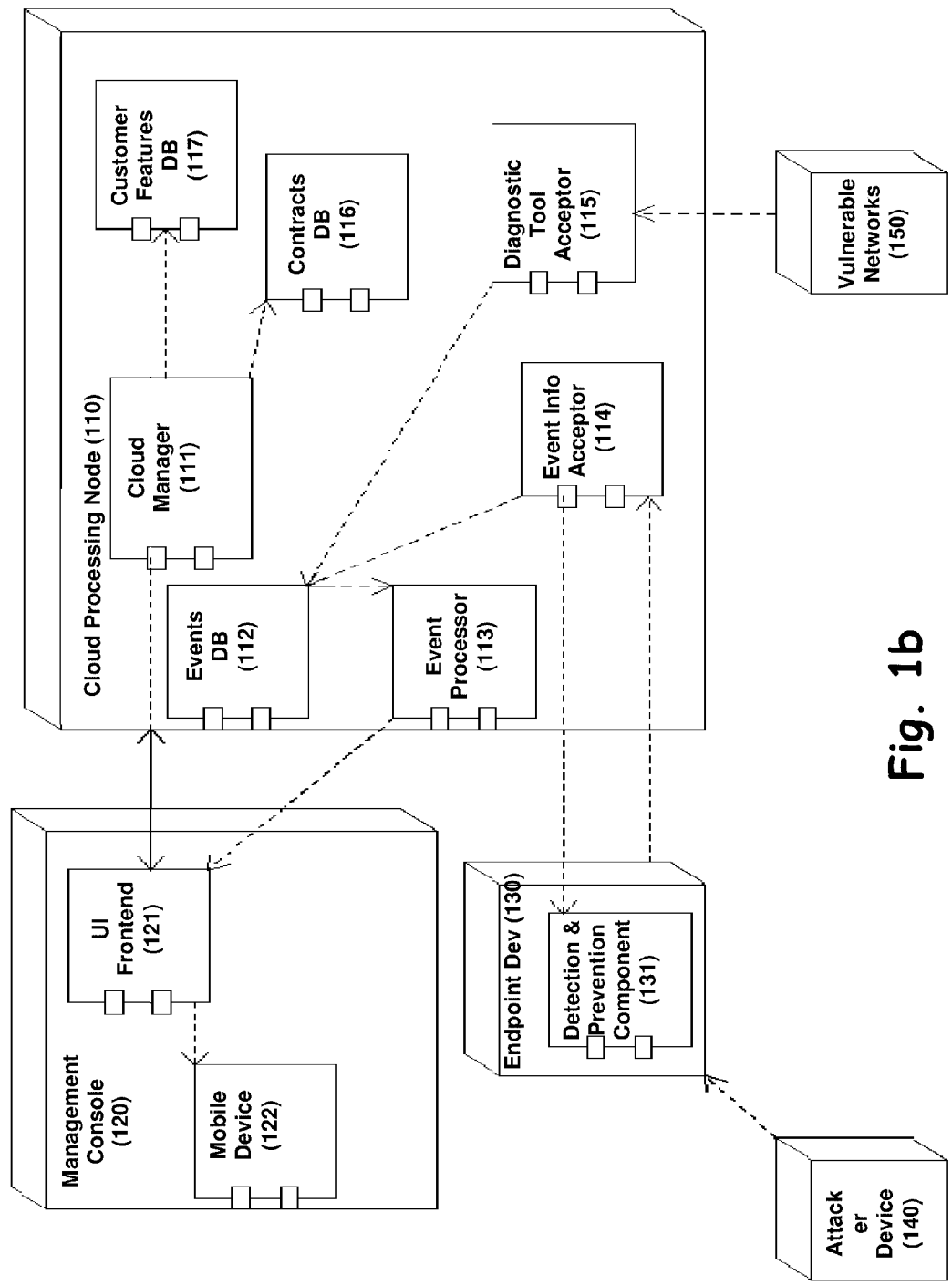
FIG. 1b illustrates the detailed flow of an attack and location-based preventive measures, constructed according to the principles of the present invention.

FIG. 1b illustrates a detailed flow of an attack and location-based preventive measures, constructed according to the principles of the present invention. FIG. 1b represents a Detailed Deployment Diagram, which elaborates the architecture of the system, and furthermore shows the sources of correlation between suspicious/poisoned networks and their coordinates in spatial spherical space. Thus, FIG. 1b extends the concept of FIG. 1a, to allow detection of diagnosed vulnerable networks that might already be infected or have a high 'risk-level' to be infected [see "risk-level-algorithm" as described below].

Each node in FIG. 1b represents either a physical node or a virtual instance, which represents a node. The components are contained within the nodes, and may aggregate sub-components that composite the whole structure that is known in the art.

Management console 120 monitors events. Management console 120 includes a user interface (UI) frontend 121 for the administrator, which tracks the device, such as the endpoint device 130, events and manages the database 122. Database 122 includes processed information and preprocessed device information.

One or more Endpoint device(s) 130 includes the detection and prevention component/module 131, e.g. zCore 106, which sends threat alerts and processes commands sent from the cloud 110.

Figure 4:
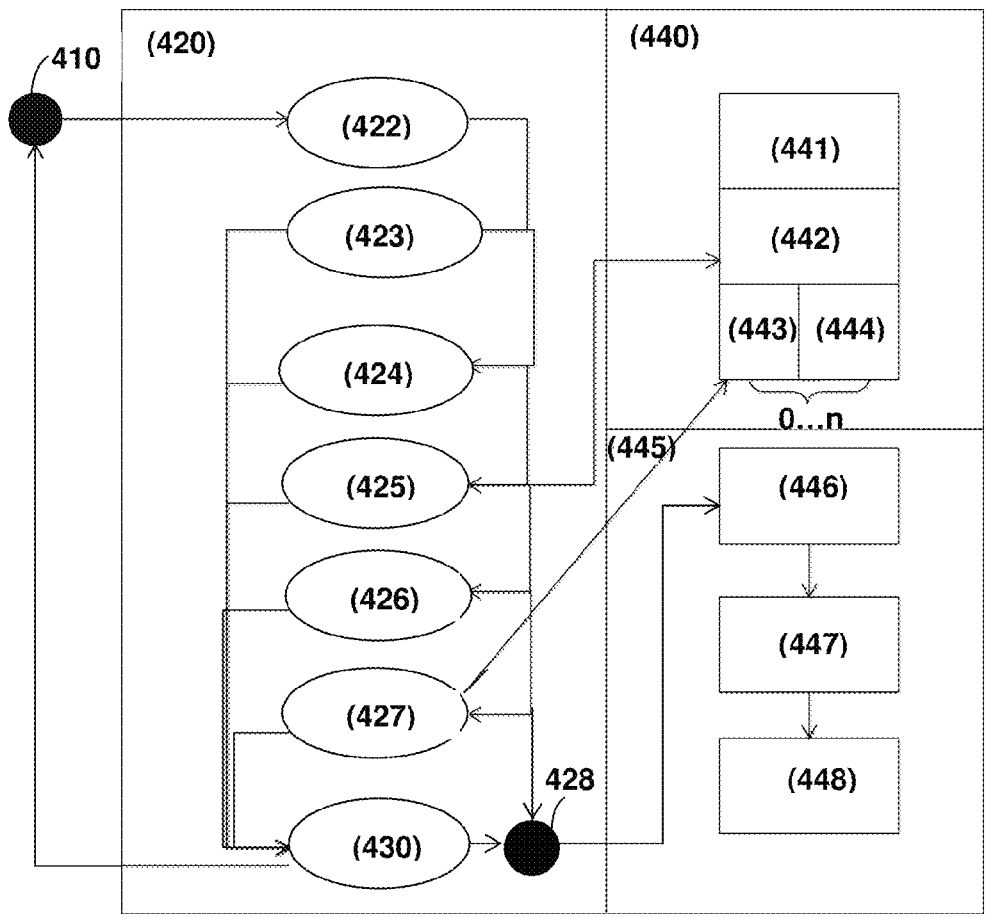
FIG. 4 is a flowchart of the state machine parsing and reporting, constructed according to the principles of the present invention.

According to some embodiments of the invention, cloud processing node 110 can be distributed over multiple physical and virtual instances and can be distributed on multiple nodes (1 . . . n), as illustrated in FIG. 4. Cloud processing node 110 elaborates further on cloud server 101 described with reference to FIG. 1a.

As shown in FIG. 1b, cloud processing node 110 may include the following components:

Cloud manager 111 manages the instances of management console 120, by using event/command queues. Cloud manager 111 sends event notifications and receives commands, for example in canonical structure as described with reference to FIG. 4. According to one embodiment of the invention, cloud manager 111 relies upon a contracts database 116 and a customer features database 117.

Events database 112 includes the events and corresponding parameters. For example, the spatial coordinates of the location in which the threat event happened. Events database 112 is the redundant raw database, prior to processing.

Figure 2:
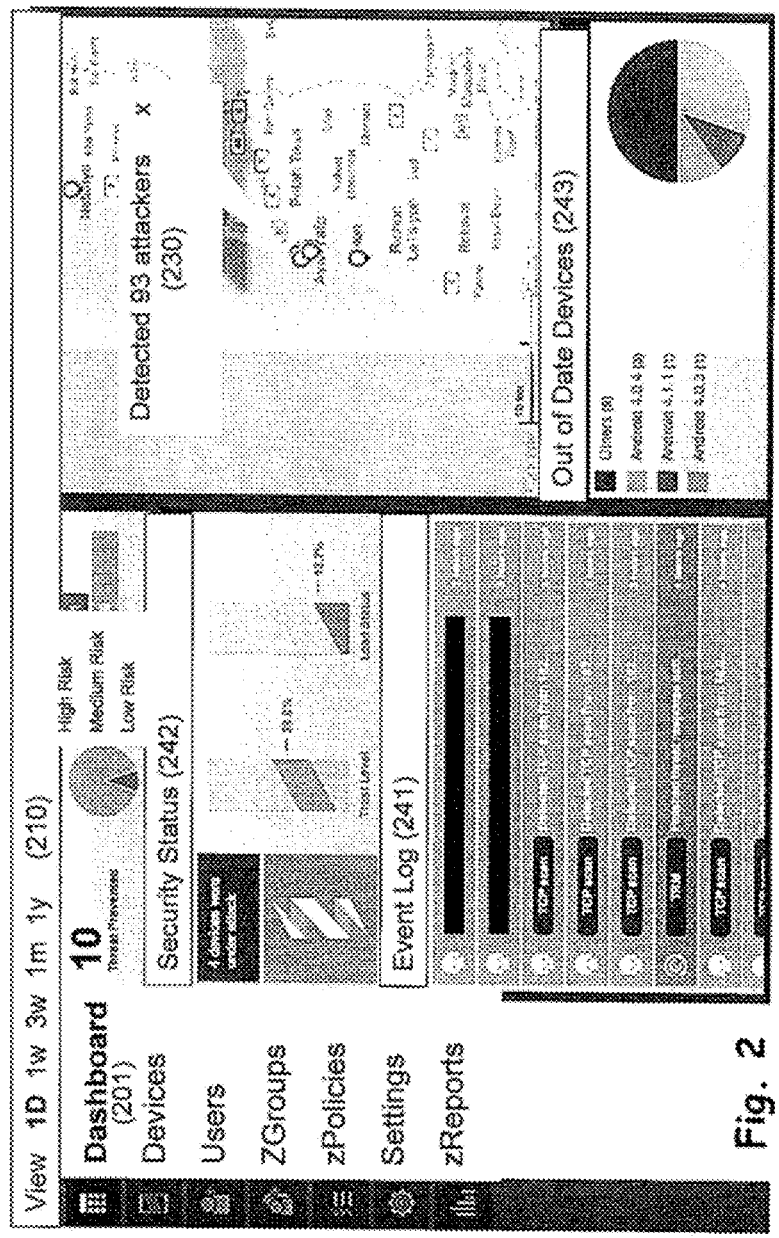
FIG. 2 is a screenshot of the console for the dashboard, with a map illustrating a cluster of attacks accompanied by an event log, constructed according to the principles of the present invention.
Figure 3:
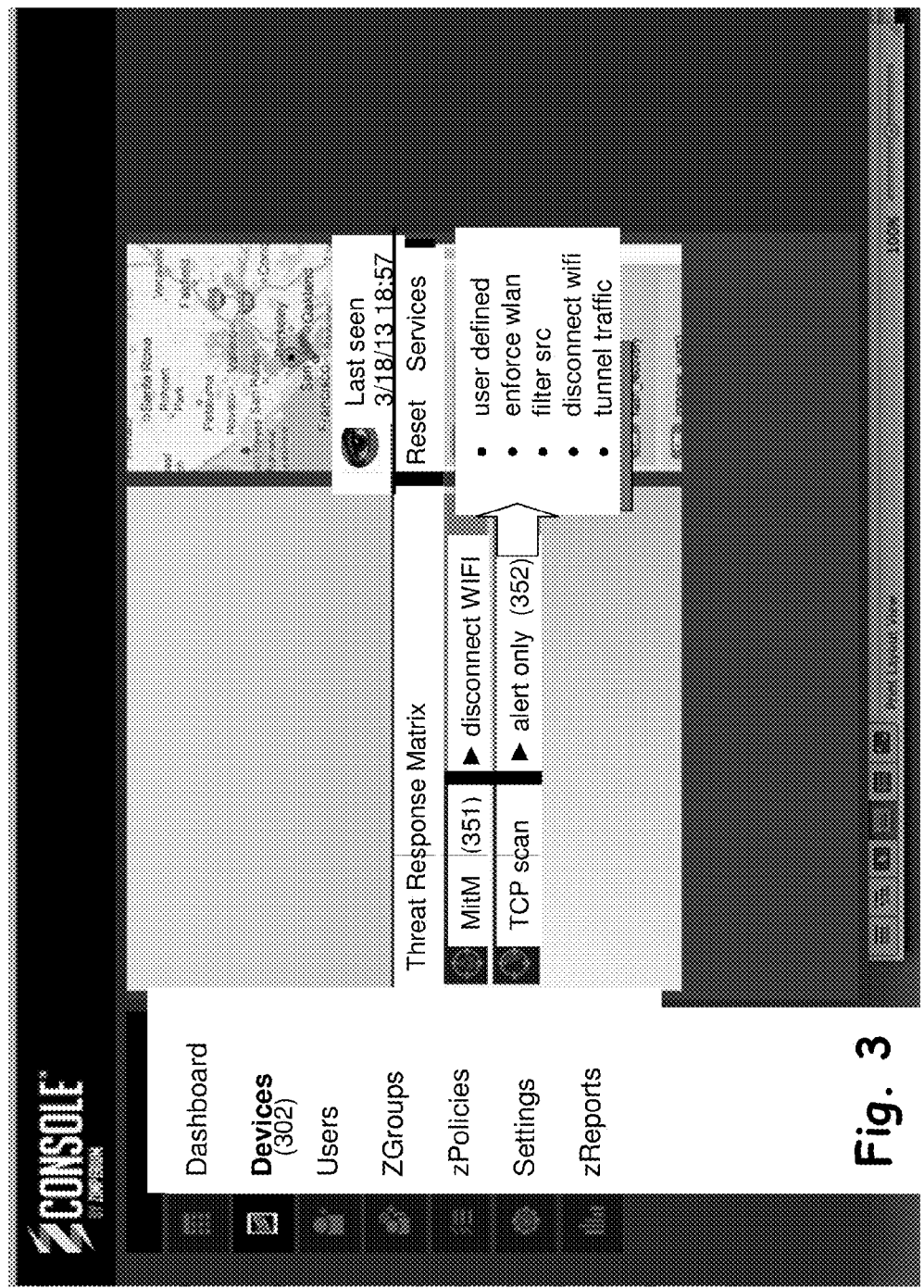
FIG. 3 is a screenshot of the console for device management, pinpointing a geographic danger zone, constructed according to the principles of the present invention.

The event processor 113 de-queues raw events from events database 112, and calculates the values needed for UI front end 121, in order to display the events, as further illustrated in FIGS. 2 and 3.

An event info acceptor 114 accepts event information from the endpoint device(s) 130, including information such as forensics data, location data, current status, current connected networks and other parameters collected in a canonical form prior to processing by event processor. The event information acceptor 114 queries the commands that should be sent to the endpoint device 130, and returns all the queued commands and generated commands from recent events. A diagnostic tool acceptor 115 reports vulnerable networks 150.

Flow of Data in FIG. 1b:

In step (a) endpoint device 130 is attacked by an attacker 140, detection and prevention component 131 builds a canonic message with a dynamic set of parameters, pending identification of the event type (e.g. the attack). Among other events being sent are events containing information on threats detected, and sync events generated when connecting to new networks.

In step (b) as endpoint device 130 connects to a new network, detection and prevention component 131 sends an event containing descriptors of all available location information from endpoint device 130 describing the current networks, the network to which the device is currently connected, the signal strength and other information which is eventually processed on event processor 113 of cloud processing node 130.

In step (c) when a 'threat detected' event occurs for an endpoint device 130, the event database 112 triggers the event processor 113, which correlates the network physical location parameters in the spatial sphere to the threat and network identifiers such as SSID and BSSID which are the Media Access Control (MAC) address of a network (the hardware address of a device connected to a network) such a WiFi network and the name of the network for an event of a network based attack. This allows tracking of the history of events and querying of the network's risk level at any time, especially prior to connecting to it.

In step (d), a 'sync' event occurs for the device as the event database 112 triggers the event processor 113, which looks for a network with the same characteristics in the database, such as the SID/BSSID and other network characteristics which are known in the art and looks for suspicious networks within the variable radius, which can be controlled by management console 120. As a result of the query of nearest neighbors of the network connected, a command is queued for the device describing the nearby networks that are suspected, and the risk level designation of endpoint device 130 is increased.

FIG. 2 is a screenshot of the console for the dashboard, with a map illustrating a cluster of attacks accompanied by an event log, constructed according to the principles of the present invention. Various time frames may be viewed 210, in this case one day. The attack geo-locations are shown on a map. The number of attacks for a pinpointed area is displayed 230. Event log 241 shows the type, source and time of each event. Security status 242 shows the number of devices under attack, trust level and load status. Out of date devices 243 shows the type and number of devices no longer capable of being analyzed.

According to some embodiments as shown in FIG. 2, the attacks are shown on the map 230 and listed on the event log 241. The point on the map can be zoomed and moved in four directions. If one clicks on an attack on the map it shows information about the attack such, as the type of device. Event log 241 also shows the GPS coordinates of the attack.

FIG. 3 is a screenshot of the console for device management, pinpointing a geographic danger zone, constructed according to the principles of the present invention. zIPS detects a man in the middle (MITM) attack on an android device, constructed according to the principles of the present invention. The MITM attack 351 intercepts a communication between two systems. For example, the target is the TCP connection between client and server. The attacker splits the original TCP connection into 2 new connections, one between the client and the attacker and the other between the attacker and the server. Once the TCP connection is intercepted, the attacker acts as a proxy, being able to read, insert and modify the data in the intercepted communication. In a TCP scan 352 port scanners use the operating system's network functions. If a port is open, the operating system completes the TCP three-way handshake, and the port scanner immediately closes the connection to avoid performing a kind of Denial-of-service attack.

FIG. 4 is a flowchart of the state machine parsing and reporting, constructed according to the principles of the present invention. FIG. 4 illustrates the finite state machine implemented to parse commands' raw data and act as an adapter to build primitive type commands, which are canonized into a complex command structure.

The state machine moves from one state to the other. The state machine can be either in the error state or 'everything is normal' state. Because of the canonical structure of the state machine, even if there is a single error in one of the parameters, it can be ignored. If the command is verified one can implement the canonical structure to execute the command.

Server data 410 is serialized, layered on top of a network protocol, decoded and queued for processing as a message. Command builder is trigged for each command asynchronously when the queue isn't empty. The state machine initially assumes for each command that was enqueued, that it will be dequeued and passed on to the system to the idle/begin state.

The State machine 420 describes the different states when parsing each message and building the canonical format of the command for execution.

Reference block 440 represents the primitive structure canonic form, and data layout registers that are used to build the commands. Command parameter name 443 and empty value 444 pairs are added to each canonical command structure dynamically according to parameters that were sent from state machine 420 to command structure canonic form 440. Empty value 444 is the command's canonic parameter "value," which can be a primitive, such as an integer, character string, floating point variable, etc. . . . , or a complex, encoded, structure serialized into the buffer and encoded.

INIT state 422 starts parsing command delimiters, for canonical commands, and proceeds to the command name field.

IN_COMMAND_SECTION state 423 is a parser which verifies the legitimacy of commands and proceeds with canonical instance. IN_COMMAND_SECTION state 423 also verifies that the canonical structure of the command 440 wasn't tampered with.

IN_COMMAND_NAME state 424 is a parser, which verifies the command name with registered command/handlers.

IN_DELIMITER state 425 is a unique delimiter, which separates the canonical data structure breaks into the FINI state.

IN_PARAM_NAME state 426 maps a parameter name, verifies that its standard command variable, and adds an entry for the new parameter name 443 and an empty value field 444. The transitions from this state may be IN_ARAM_VALUE state 426 for filling a parameter value or ERROR state 430, which handles parsing errors;

IN_PARAM_VALUE state 427 maps a parameter value to a collection of parameters on canonical command structure. The next state will be IN_DELIMITER state 424 or ERROR state 430.

In FINI state 428 is the state machine returns to FINI state 428 when all commands are parsed or an error occurred. FINI state 428 in turn triggers the execution of built canonical commands.

ERROR state 430 enables the state machine to handle an error while building the canonical commands. If the error is related to a partial message being parsed or missing parameters it agnostically allows the canonical structure to coexist and is executed as a command data structure. Agnostically refers to something that is generalized so that it is interoperable among various systems.

Triggered commands may ACK (acknowledge) occurrence of an event, notifying the cloud services the results of the command execution and the overall system state on the endpoint device. When the canonical format of the message is built, or the system reaches FINI state 430 with a valid canonical command, the command factory is used to create a concrete command handler from the canonically represented data set.

A Command Queue Handler subsystem 445 handles the concrete command handlers that were built using the primitive canonical format. Command Queue Handler subsystem 445 dequeues 447 from the command queue and executes 448 the commands sequentially or in parallel on the device itself. If the command generates any events in return, the events are queued 448 for a query builder to format the events accordingly to endpoint protocol.

Signature 446 enqueues the concrete command into a handler queue, which is processed asynchronously.

Figure 5:
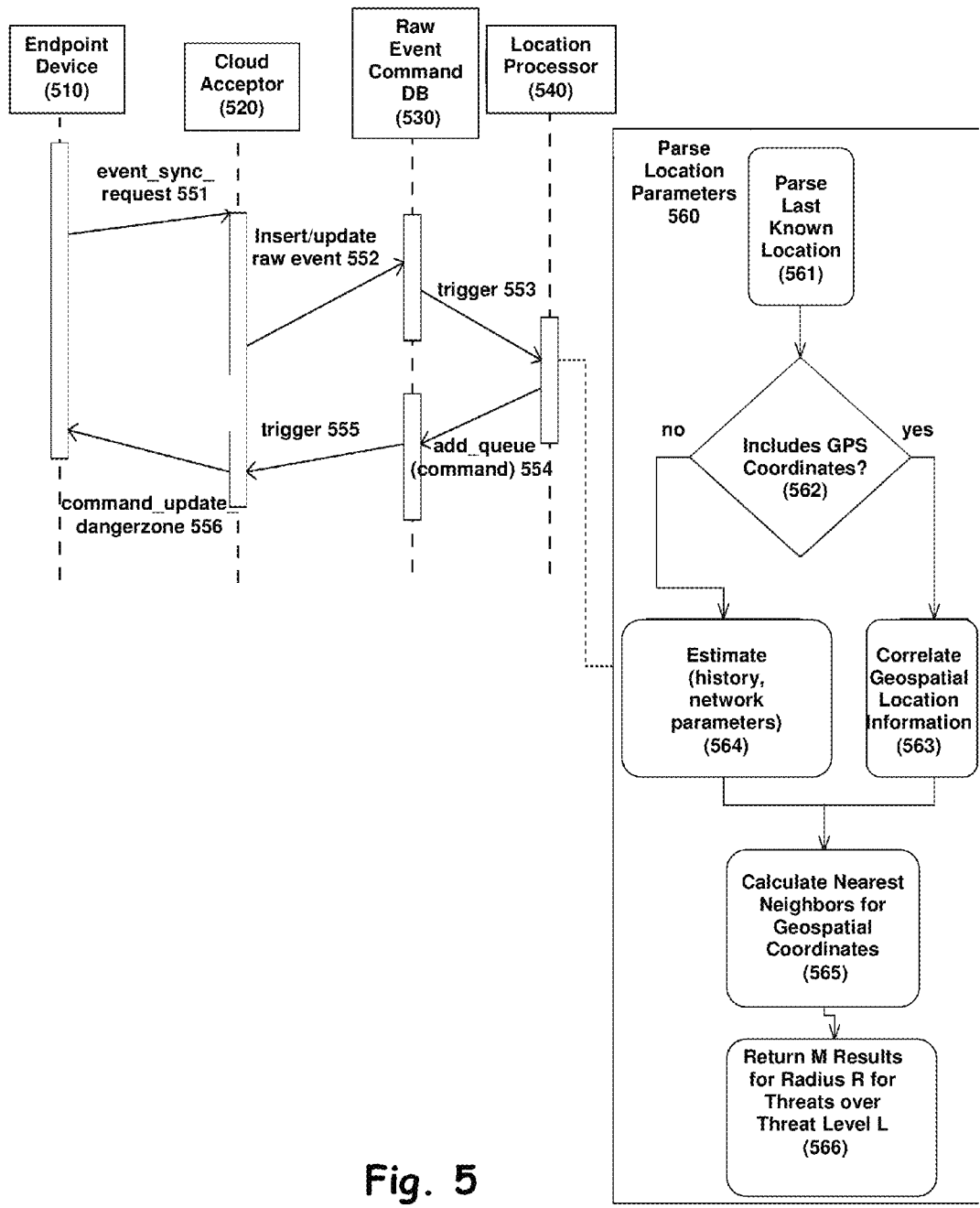
FIG. 5 is a flowchart of the protocol procedure from the endpoint, constructed according to the principles of the present invention.

FIG. 5 is a flowchart of the protocol procedure from the endpoint device 510, constructed according to the principles of the present invention. The operation is exemplified by a sync request sent upon connection to a new network, and is processed on the cloud servers as described above. The data flow diagram (DFD), comprising elements 551-556, elaborates on the operation that the location processor is doing in order to classify the nearest neighbors.

Endpoint device 510 sends an event such as event_threat_detected or event_sync_request 551, canonically aggregating parameters as described with reference to the 'command' structure in FIG. 4. These events differentiate from commands only in direction. i.e., events are outgoing from devices to the cloud server, commands are incoming to devices from the cloud.

When event_sync_request 551 is sent from endpoint device 510 to the cloud acceptor 520, cloud acceptor 520 handles the event, decoding it's fields and variables, allowing a flat structure to be handled on the raw event/commands database 530.

Raw event/commands database handles redundant intermediate data that describes events from multiple devices, it parses the event data extracting all the required parameters and stores outgoing commands targeting endpoint device 510.

Cloud Acceptor 520 then inserts the raw event, or updates the event parameters 552 into database 530. Raw events/commands database 530 then triggers 553 location processor 540 to handle the event. The cloud processor, as described above, parallel parses events and their parameters, allowing optimized processing for those redundant events. When the cloud processor gets triggered 553, all the different processors for the event are handling the data, and correspondently update values that are related to representation of the event, pre-calculate parameters and even determine missing parameters. One of the processors is Location Processor 540, which upon getting triggered 553, starts a flow for parsing location parameters 560 that determines the list of networks.

First it parse the last known location 561. Then it checks if the GPS coordinates given in the event yield logical coordinates 562. If it does, it correlates the geospatial coordinates with other location indicators 563, such as signal strength, to estimate the geospatial location of the WiFi networks surrounding the device. If the GPS coordinates are missing 564 the location processor alternative is to estimate geo-IP and nearby networks that historically were already correlated to the GPS location. After location was gathered by either method 563/564 the next step is to calculate the nearest neighbor networks for the given geospatial coordinates 565. This is done by querying the geospatial location of dangerous networks for a given radius, for M available slots 566. M indicates how many results are wanted for radius R, and apply to it the nearest neighbor calculation which is known in the art and supported on most database platforms such as Mysql, Postregsql, MongoDB, etc.

This command is inserted into raw events/commands database 530, by location processor 540 and further triggers 555 cloud acceptor 520 to return the command 554 to endpoint device 510. The result of this calculation is a command describing the nearby networks 'command_update_danger_zones' 556.

The device then parses the command as described above with reference to FIG. 4.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

The present embodiments apply to wireless networks including WiFi (such as IEEE 802.11a,b,c,d,e,f, etc.) but not limited thereto. The embodiments are also relevant to Code Division Multiple Access (CDMA), CDMA-2000 and wideband CDMA (WCDMA) cellular radiotelephone receivers for receiving spread spectrum signals, Global System for Mobile communication (GSM) cellular radiotelephone, General Packet Radio Service (GPRS), Extended GPRS (EGPRS), third generation cellular systems (3G), 3GPP Long Term Evaluation (LTE) and the like. For simplicity, although the scope of the invention is in no way limited in this respect, embodiments of the invention described below may be related to a CDMA family of cellular radiotelephone systems that may include CDMA, WCDMA, CDMA 2000 and the like. Alternatively, embodiments of the invention may well be implemented in wireless data communication networks such as those defined by the Institute for Electrical and Electronics Engineers (IEEE).

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A method for detecting an attack in a wireless network comprising at least a server and a plurality of computer devices wirelessly connected to the server, the method comprising:

detecting, by a first computer device, an attack on the first computer device by an attacking entity via the wireless network;

determining a geographic location corresponding to the wireless network based on location information associated with the first computer device and one or more network characteristics of the wireless network;

associating the detected attack with the determined geographic location; and transmitting the association between the detected attack and the determined geographic location to the server, the server configured to:

determine that the wireless network is compromised based on a threshold number of detected attacks detected by a plurality of computer devices including the first computer device, each of the threshold number of detected attacks being associated with locations within a geographical danger zone surrounding the determined geographic location;

prior to a second computer connecting to the wireless network, determine that the second computer device has physically entered the geographical danger zone after the detected attack, the second computer device not included in the plurality of computer devices; and prior to the second computer connecting to the wireless network and in response to determining that the second computer device has entered the geographical danger zone, notify the second computer device that the wireless network is compromised.

2. The method of claim 1, further comprising classifying the wireless network according to a category of the attack, wherein the server is further configured to notify the second computer device of the classification of the wireless network.

3. The method of claim 2, wherein the wireless network is classified as a compromised network in response to a detection of a predefined threshold number of attacks via the wireless network.

4. The method of claim 1, further comprising classifying the geographic location as dangerous in response to the determination that the threshold number of detected attacks are associated with locations within a threshold distance of the determined geographic location.

5. The method of claim 4, further comprising identifying a geographic area corresponding to the geographic location by calculating a geo-spatial location corresponding to the first computer device.

6. The method of claim 1, wherein the second computer device is configured to block access to the wireless network in response to receiving the notification from the server.

7. The method of claim 1, wherein the transmitted association comprises one or more of: a time of the attack, an attack type, a MAC address of the attacking entity, a MAC address of the wireless network, a BSSID (Basic Service Set Identity), an SSID (Service Set Identifier), GPS (Global Positioning System) coordinates, and a geo IP location.

8. The method of claim 1, wherein the server is a cloud server.

9. The method of claim 1, wherein the first computer device comprises one of: a mobile device, a smart phone, a tablet computer, or a laptop computer.

10. The method of claim 1, wherein the detected attack comprises one of: an MITM attack, ARP spoofing, DNS poisoning, Port scanning, and Malicious injection.

11. The method of claim 1, wherein the second computer device is further configured to establish a secure connection to the server for analysis of threats or attacks taking place near the geographic location.

12. The method of claim 1, wherein the one or more network characteristics include at least one selected from a group consisting of a media access control (MAC) address of the wireless network and a service set identifier of the wireless network.

13. A computer device for detecting an attack in a wireless network comprising at least a server connected and a plurality of computer devices wirelessly connected to the server, the computer device comprising:
a detection/prevention module configured to:
detect an attack on the computer device by an attacking entity via the wireless network;
determine a geographic location corresponding to the wireless network based on location information associated with the first computer device and one or more network characteristics of the wireless network; and
associate the detected attack with the determined geographic location; and
an output configured to transmit the association between the detected attack and the determined geographic location to the server, the server configured to:
determine that the wireless network is compromised based on a threshold number of detected attacks detected by a plurality of computer devices including the first computer device, each of the threshold number of detected attacks being associated with locations within a geographical danger zone surrounding the determined geographic location;
prior to a second computer connecting to the wireless network, determine that the second computer device has physically entered the geographical danger zone after the detected attack, the second computer device not included in the plurality of computer devices; and
prior to the second computer connecting to the wireless network and in response to determining that the second computer device has entered the geographical danger zone, notify the second computer device that the wireless network is compromised.

14. The computerized system of claim 13, wherein the transmitted association comprises a canonic message.

15. The computerized system of claim 13, wherein the output is further configured to notify an additional computer device located within a threshold distance of the computer device that the wireless network is compromised.

16. The computerized system of claim 13, wherein the output is further configured to notify an additional computer device in response to the additional computer device moving from outside a threshold distance of the computer device to within the threshold distance of the computer device, the notification comprising a list of all nearby compromised networks.

17. The computerized system of claim 13, wherein the server is further configured to provide a threat level map to the second computer device, the threat level map identifying a threat level for each of one or more geographic regions.

18. The computerized system of claim 17, wherein the threat level map indicates a classification for each of the one or more geographic regions based on a number of threats detected in each geographic region.

19. The computerized system of claim 13, wherein the geographic location corresponding to the wireless network is determined based on historical network parameters.

20. The computer device of claim 13, wherein the one or more network characteristics include at least one selected from a group consisting of a media access control (MAC) address of the wireless network and a service set identifier of the wireless network.

* * * * *